C. M. DOWELL.
SUPPLEMENTAL TRACTOR DEVICE.
APPLICATION FILED APR. 10, 1920.
1,370,293. Patented Mar. 1, 1921.
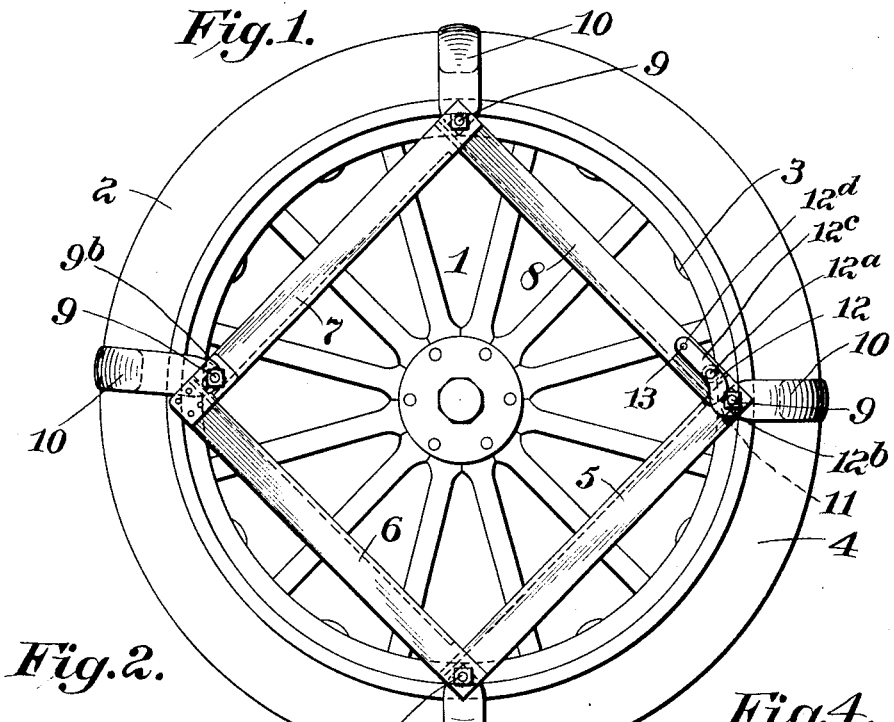
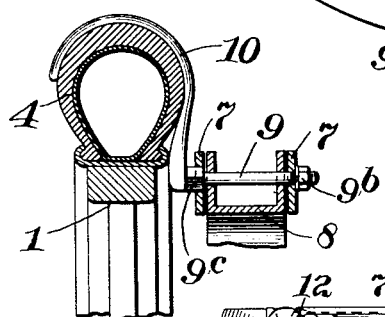
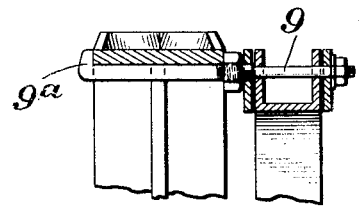
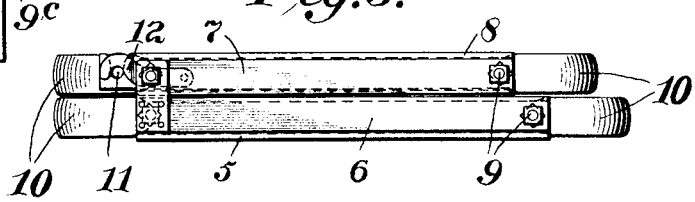
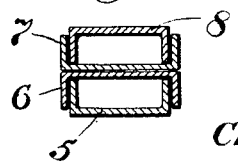
Inventor:
Chester Mandel Dowell,
By Spear, Middleton, Donaldson & Hall
Attorneys.

UNITED STATES PATENT OFFICE.

CHESTER MANDEL DOWELL, OF HUNTINGBURG, INDIANA.

SUPPLEMENTAL TRACTOR DEVICE.

1,370,293. Specification of Letters Patent. Patented Mar. 1, 1921.

Application filed April 10, 1920. Serial No. 372,913.

*To all whom it may concern:*

Be it known that I, CHESTER MANDEL DOWELL, a citizen of the United States, and resident of Huntingburg, in the State of Indiana, have invented certain new and useful Improvements in Supplemental Tractor Devices, of which the following is a specification.

My invention relates to vehicle wheels and more particularly to the class of detachable supplemental tires for use in connection therewith by which additional tread surface is afforded when passing over soggy or sandy roads.

It is well known that vehicles, especially automobiles, motor trucks and tractors, because of their weight, encounter great difficulty in traveling over bad roads and through plowed fields, the ordinary traction wheels often becoming embedded in the soft earth.

The primary object of my invention is to provide a supplemental tire which may be quickly and easily attached to the ordinary type of motor vehicle wheel to afford a wide tread surface, thereby reducing the liability of the wheel becoming mired and at the same time give traction whereby the wheel will be prevented from slipping.

A further object is to provide a device of this character which may be folded into compact form when not in actual use.

A still further object is to provide a device of this character which is simple in construction, efficient in operation, durable and economical to manufacture.

I am aware of numerous devices of this kind which, by the provision of a circular supplemental tire, prevent to a certain degree, the sinking of the wheel into the mud, but I have discovered that by utilizing a frame made up of straight sections, thereby exposing a flat surface to the soft earth, the wheel is less liable to sink and the angles at the intersections afford positive traction, While I shall describe my invention as detachably applied to the wheel of an automobile, it is to be understood that it may be applied to any vehicle wheel either detachably or permanently.

My invention consists in the novel construction, combination of parts and details as hereinafter described.

In the drawings:

Figure 1 is a side elevation of an automobile wheel equipped with one form of my invention.

Fig. 2 is a transverse section of Fig. 1.

Fig. 3 shows my device in folded position.

Fig. 4 is a section of a tractor wheel equipped with my invention.

Fig. 5 is a transverse section of Fig. 3.

1 indicates generally an automobile wheel having the usual rim 2 secured to the felly thereof by a series of bolts 3 and carrying the usual pneumatic tire 4.

The supplemental tractor element comprises a series of straight sections 5, 6, 7 and 8, preferably of sheet metal in channel form, the channels facing outward and the alternate sections being slightly smaller so as to nest with the adjoining sections and assume when folded the position shown in Fig. 3. The sections are connected by bolts 9 secured by nuts $9^b$. The bolts 9 have a squared portion shown at $9^c$ adapted to fit into corresponding apertures in the channel sections 5, 6 and 7 when the device is on the wheel and lock the hooks 10 in proper position. The inner ends of the bolts 9 are upturned to form these hooks 10 which engage the outside of the tire 4.

The end section 8 of the device has a recess 11 adapted to partially embrace the bolt 9 of the adjoining section 5 and is held in position by a latch member 12 of spring metal, pivoted at $12^a$ and having a hooked end $12^b$ which registers with the recess 11 so as to completely encircle the bolts 9 and a straight portion $12^c$ having an aperture $12^d$ near its outer end which engages a pin 13 on the channel 8 to hold the hook 12 in engagement with the bolt 9.

In the form of my invention shown in Fig. 4, the bolts 9 are of such length as to extend beneath the rim of the wheel and have an upturned end $9^a$ which engages the inside of the rim and holds the device in position.

While I have described my supplemental tractor element as comprising four sections, it may be made in polygonal, sexagonal or hexagonal form without departing from the spirit of my invention.

One of the important features of my invention is the nesting of the sections whereby the device when not in actual use will occupy a minimum amount of space and can easily be carried in the tool box or other storage compartment of the automobile.

Another advantage is that by utilizing the hooks around the outside of the pneumatic tire to hold the device in position, no part of the frame comes in contact with the wheel proper thereby preventing the marring of the painted surface, moreover, the hooks give added traction.

In applying the device to the wheel of an automobile, it is only necessary to unfold the sections, place the hooks successively in position around the tire, secure the end sections together by means of the latch members 12 and tighten the bolts 9, which requires a negligible amount of time and labor.

It will be seen that the device will operate only after the tire proper has become embedded. As the broad flat surface comes in contact with the soft earth, it sustains the wheel so that it practically floats, at the same time compressing the earth so that as the wheel continues to revolve, the corner or angle between the sections digs in thus giving positive traction, the side of the channel preventing any tendency to sideslip.

What I claim is:

1. A supplemental tractor element for vehicle wheels, comprising a frame made up of straight sections located at the side of the wheel and within the periphery thereof, each section being of channel form in cross section.

2. A supplemental tractor element for vehicle wheels, comprising a frame made up of straight sections in channel form, alternate sections being smaller whereby they may be nested.

3. A supplemental tractor element for vehicle wheels comprising a frame made up of sections placed at an angle to each other so as to form corners and connected by bolts, and a series of hooks carried by said bolts for engaging the outside of the wheel tire to hold said frame in position.

4. A supplemental tractor element for vehicle wheels comprising a frame made up of straight sections placed end to end at an angle to each other and connected by bolts, and means carried by said bolts for engaging the wheel tire to hold said frame in position.

5. A supplemental tractor element for vehicle wheels comprising an endless frame made up of sections, each of said sections being straight throughout its length, said sections being adapted to be nested together when folded.

In testimony whereof I affix my signature.

CHESTER MANDEL DOWELL.